Nov. 6, 1951 O. N. HULT 2,574,393
CONTROL FOR AUTOMATICALLY PRESETTING BLOCKS ON SAWMILL CARRIAGES
Filed June 24, 1948 5 Sheets-Sheet 1
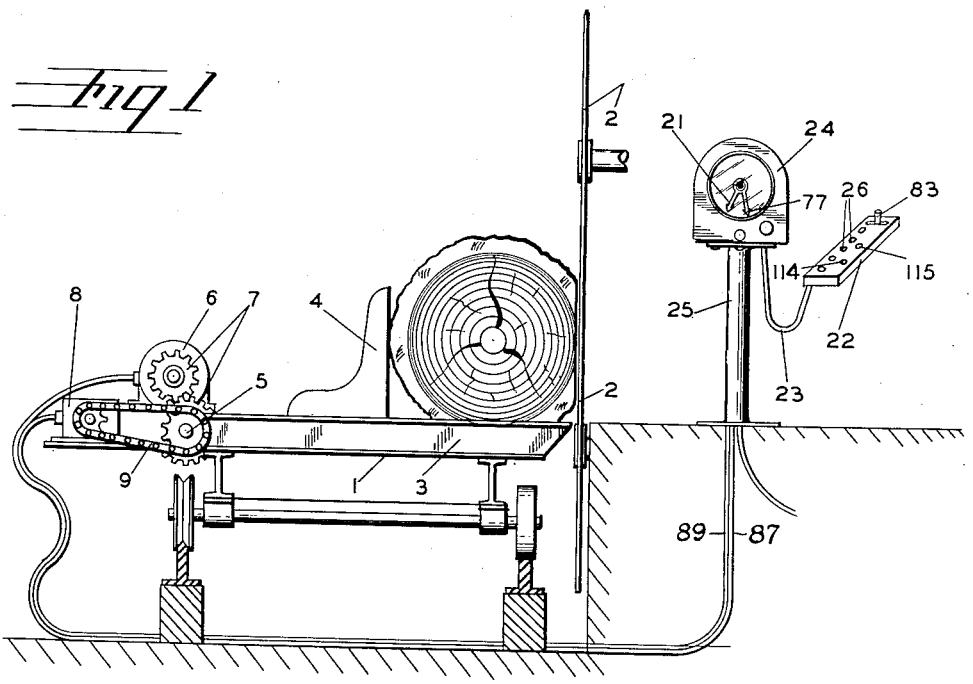
Fig 1
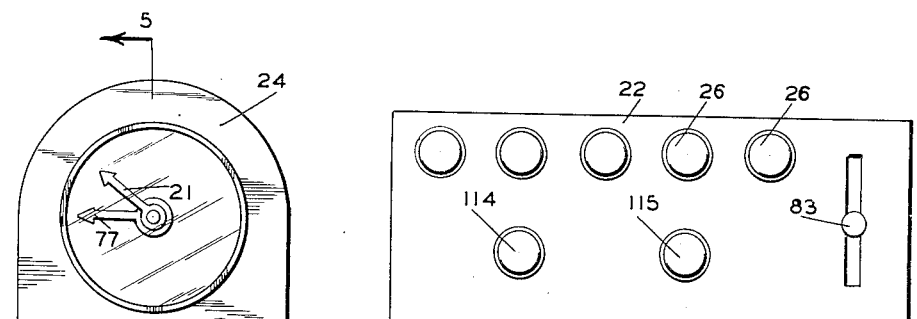
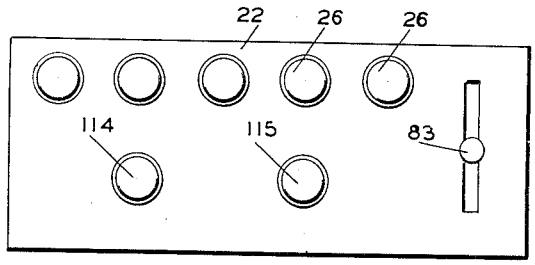
Fig 3
Fig 2
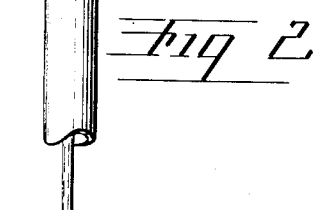
*INVENTOR.*
OSCAR N HULT
BY
ATTORNEY Nov. 6, 1951     O. N. HULT     2,574,393
CONTROL FOR AUTOMATICALLY PRESETTING BLOCKS ON SAWMILL CARRIAGES
Filed June 24, 1948     5 Sheets-Sheet 2

INVENTOR.
OSCAR N HULT
BY

ATTORNEY

Nov. 6, 1951  O. N. HULT  2,574,393
CONTROL FOR AUTOMATICALLY PRESETTING BLOCKS ON SAWMILL CARRIAGES
Filed June 24, 1948  5 Sheets-Sheet 3
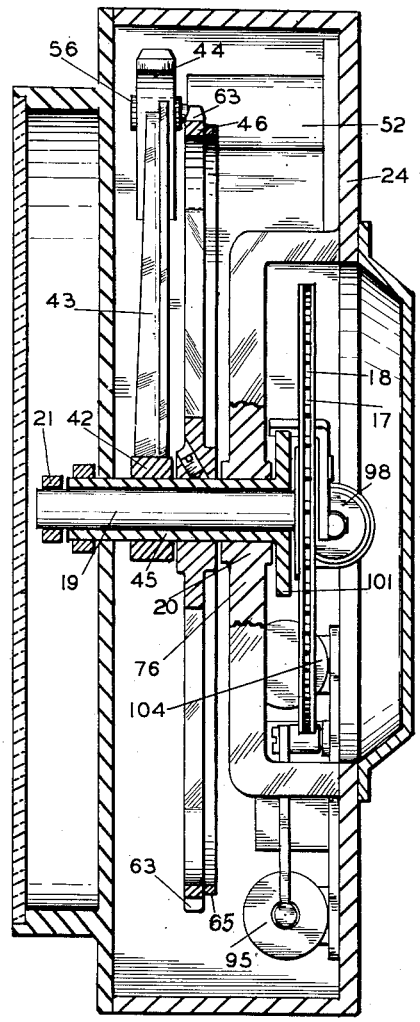
Fig 6
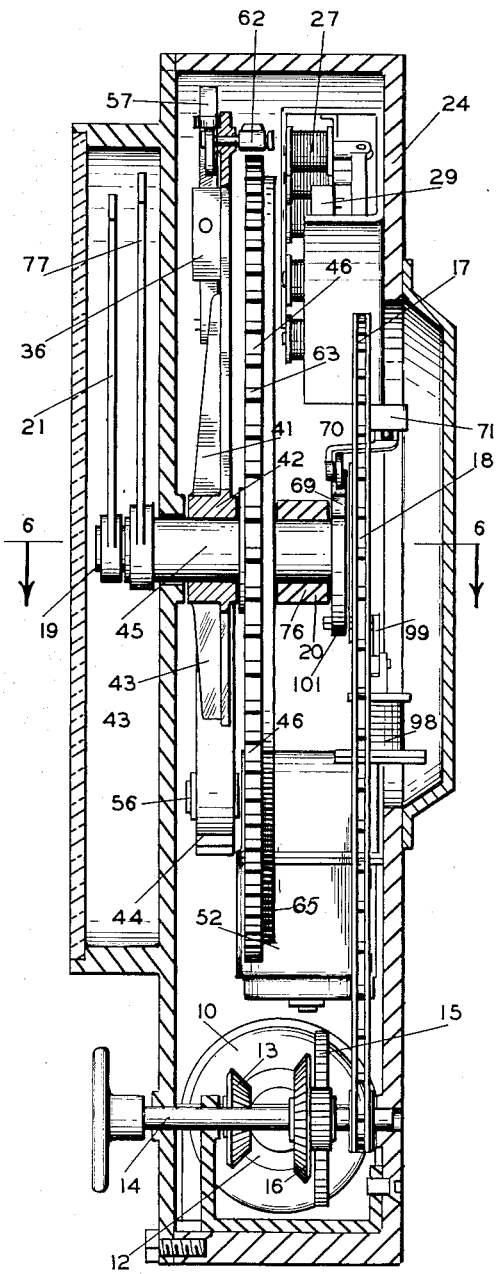
Fig 5
INVENTOR.
OSCAR N. HULT
BY 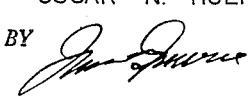
ATTORNEY Nov. 6, 1951  O. N. HULT  2,574,393
CONTROL FOR AUTOMATICALLY PRESETTING BLOCKS ON SAWMILL CARRIAGES
Filed June 24, 1948  5 Sheets-Sheet 4
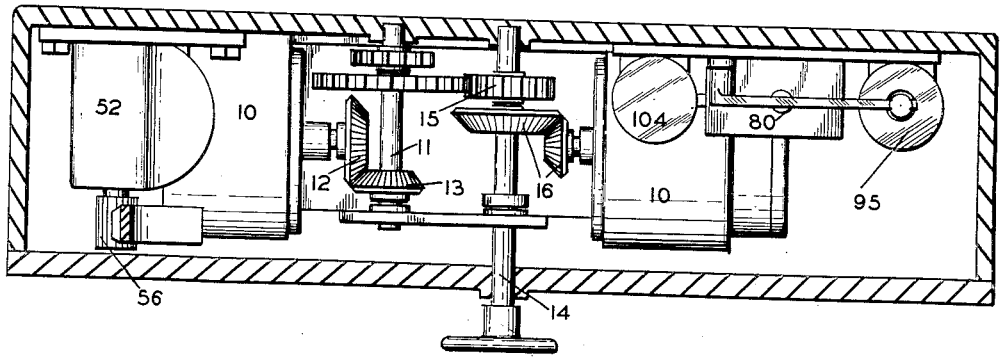
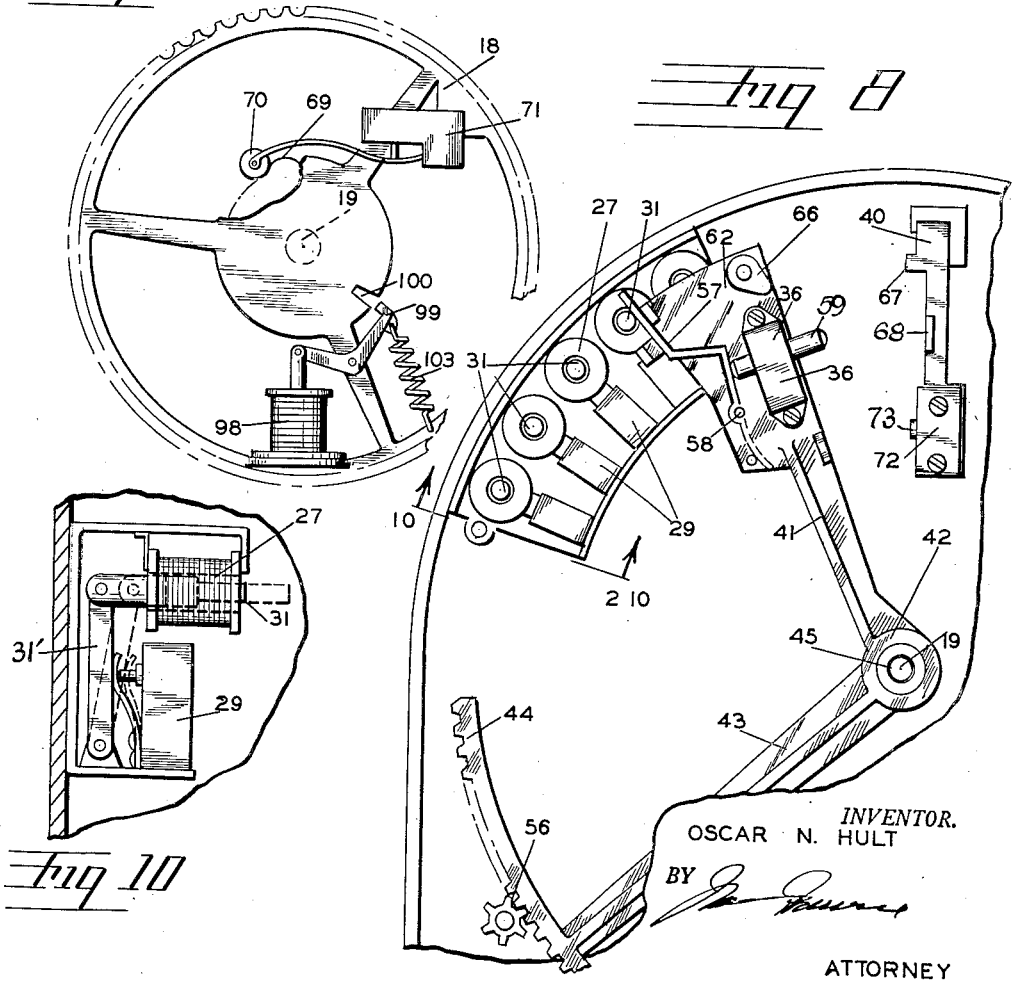
INVENTOR.
OSCAR N. HULT
BY 
ATTORNEY

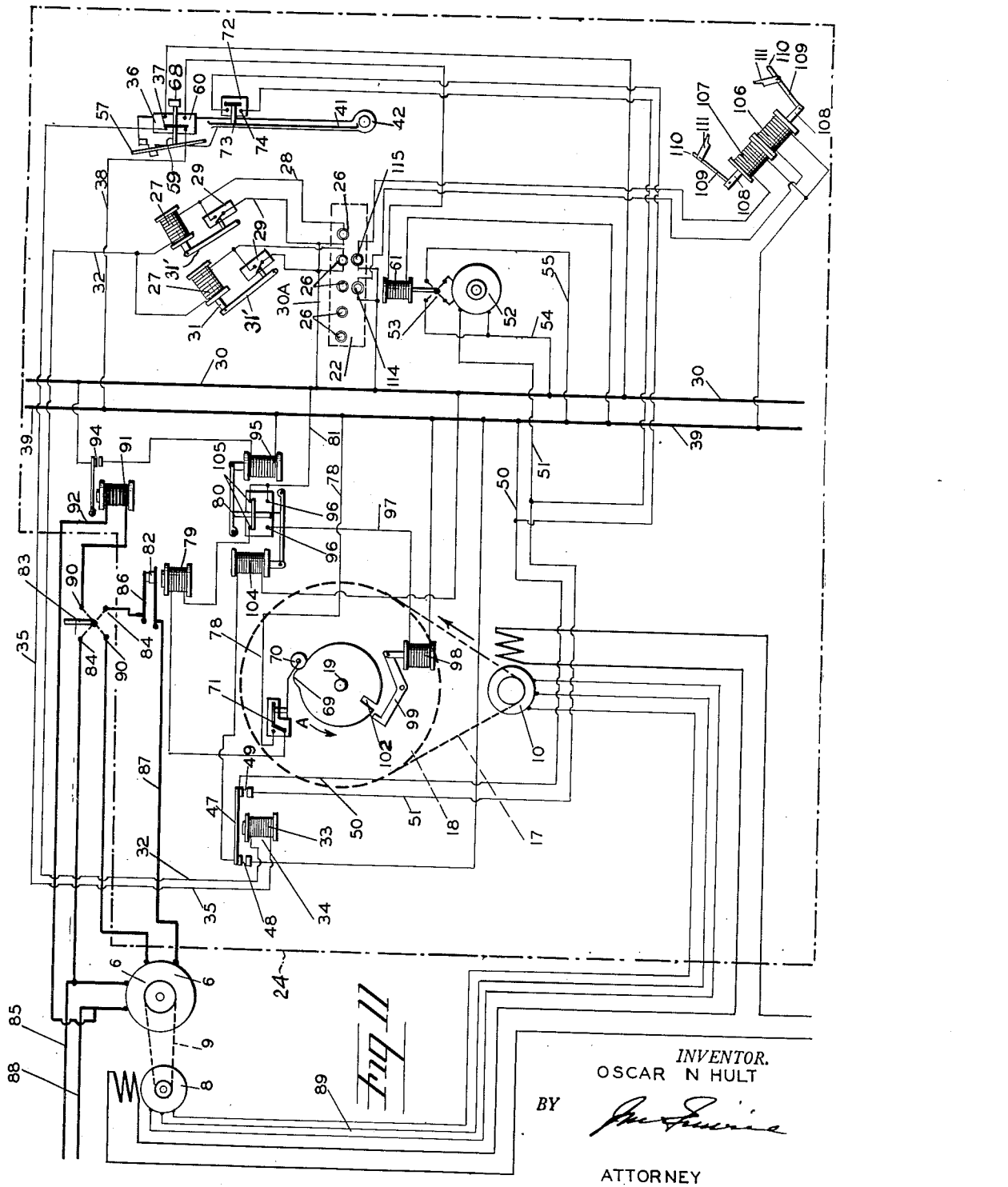

Patented Nov. 6, 1951

2,574,393

UNITED STATES PATENT OFFICE 2,574,393

CONTROL FOR AUTOMATICALLY PRESET-
TING BLOCKS ON SAWMILL CARRIAGES

Oscar Nathaniel Hult, Eugene, Oreg.

Application June 24, 1948, Serial No. 34,917

12 Claims. (Cl. 318—265)

This invention relates to apparatus for automatically pre-setting the knees on head blocks of sawmill carriages, and more particularly, to such apparatus that is adapted to be remotely controlled.

In the setting up of the knees on sawmill carriages it is desirable to control the movement of the said knees so that they will move the log towards the saw line a predetermined amount, this control being effected from the sawyer's station.

This pre-setting operation must be carried out by a very accurate control, and in order to accomplish this result it is desirable to eliminate any mechanical connections between the carriage and the mechanism of the remote control unit. This I accomplish through electrical cables running from the carriage to the control unit.

These electric cables connect synchronous generators and motors, the generators being located on the carriage, while the motors are located in the control unit. These synchronous generators and motors transfer and indicate the exact movement of the knees to the operating mechanism within the control apparatus.

With my new and improved apparatus, the operation of the knees is effected through the control apparatus by the operator, regardless of the relation or position of the control unit relative to the carriage.

The primary object of my invention is the provision of a control unit adjacent the operator and remotely located from the sawmill carriage that will automatically control the movement of the knees on the head blocks on the carriage after the control has been pre-set for a specified cut of lumber.

Another object of my invention is to provide means for the transferring of the movement of the knees of the carriage to mechanical and electrical controls within the master control unit by electric impulses, thereby requiring no mechanical connections between the carriage and the control unit.

A still further object of my invention is the provision of a control unit that can be adapted to any type of head block assembly or on any size or design of carriage.

Another object of the invention is to provide a remote control that is practically self-contained and that can be easily installed to the set works of a sawmill carriage.

Another object of the invention is the provision of means to indicate directly to the operator the exact position and movement of the knees on the carriage at all times.

Still another object of the invention is to provide a simple form of a push button control for operating the overall pre-set control mechanism so that the operator can control the movement of the knees for the particular thickness of cut from the log.

And a further object of my invention is to provide means for the controlling of the pre-setting of the movement of the knees to cut lumber in thicknesses other than the standard thickness which are usually cut, thereby giving a simple control for standard cuts and yet being able to cut fractions of standard cuts.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout and in which:

Figure 1 is an end view in elevation of a conventional log carriage having a log thereon, a cut having just been taken from the said log, and having my new and improved pre-set works control connected to the set works on the carriage;

Figure 2 is a front view in elevation of the control box;

Figure 3 is an enlarged plan view of the push button control switch assembly which is operated by the sawyer;

Figure 5 is a cross-sectional view through the control unit taken on line 5—5 of Figure 2;

Figure 6 is a cross-sectional view taken on line 6—6 of Figure 5;

Figure 7 is a cross-sectional view through the control unit taken on line 7—7 of Figure 4, and illustrating the synchronous motor assembly;

Figure 8 is a fragmentary view illustrating the pre-set mechanism in elevation;

Figure 9 is a fragmentary view illustrating the limit switch stop and locking device of my pre-set unit in elevation;

Figure 10 is a fragmentary cross-sectional view taken on line 10—10 of Figure 8 and showing one of the pre-set selector stops in side elevation; and Figure 11 is a diagrammatic layout of the control apparatus, including the control switches, mechanical elements and the wiring circuits.

Figure 4:
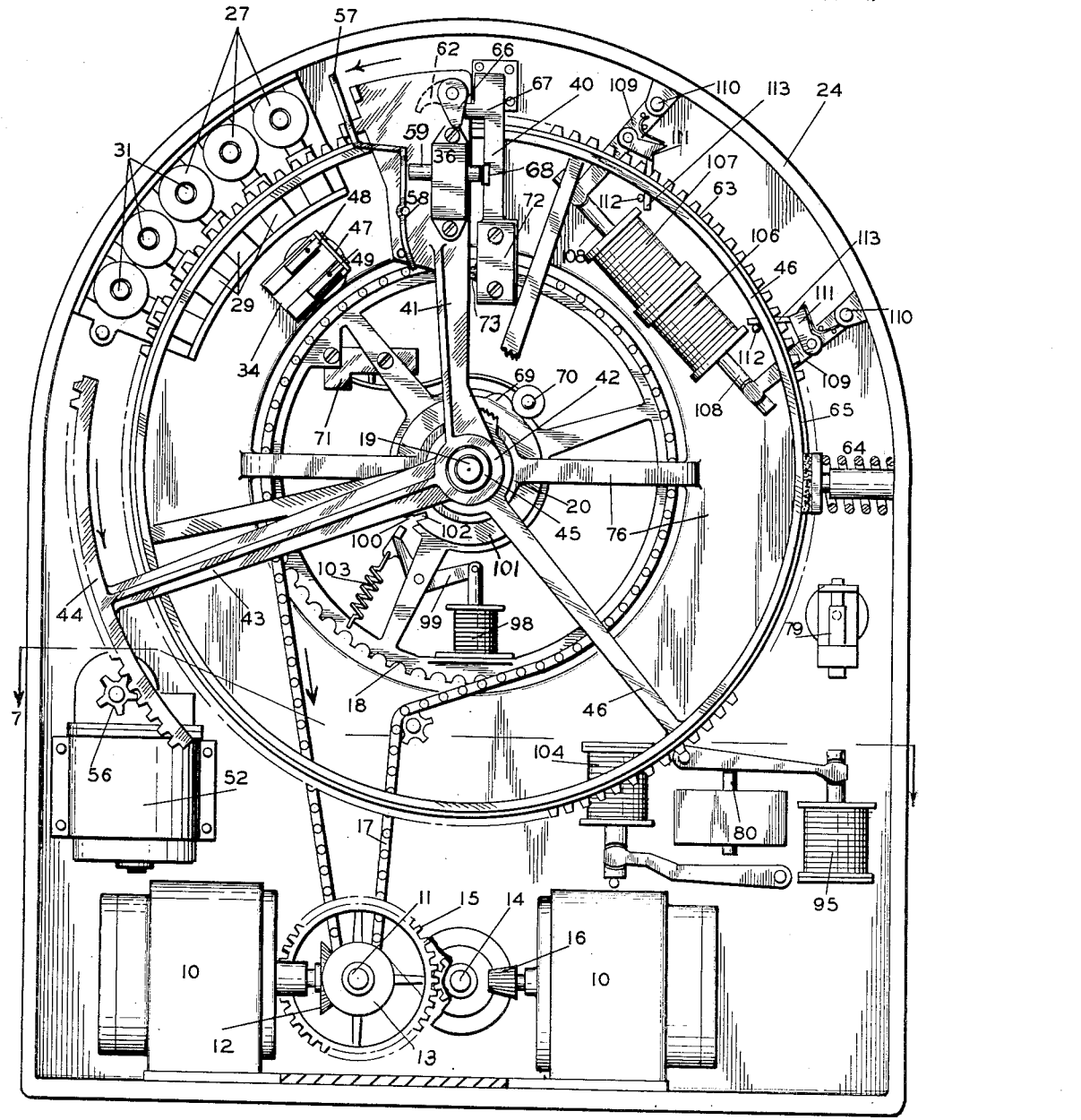
Figure 4 is a front view of the remote control pre-setting unit, the front of the case being removed to illustrate the working mechanism therein.

Referring to the drawing, specifically to Figure 1, the present invention is adapted for use with a sawmill carriage of the conventional type used in most sawmills, including head saws and head blocks 3 having knees 4 operated from the set shaft 5 which, in turn, is driven by an electric motor 6 through gears 7. The operation of the motor 6 for moving the knees 4 forward and back may be manually controlled, referring to Figure 11, as by a manually operable reversing switch which when moved to bridge the contacts 84 closes a circuit between the motor 6 and supply lines 83 and 88 to drive the motor 6 forward and when the switch 83 is moved to bridge the contacts 90 it reverses the circuit through the motor 6 between the lines 88 and 85 to drive the motor in reverse. This mechanism is of well known structure, and I do not wish to be limited to any particular form thereof, as my invention is adapted to cooperate with the set shaft 5.

The present invention comprises means for automatically effecting the operation of the motor 6 and movement of the knees 4 for a predetermined distance, and the return of the automatic control to starting position with the retraction of the knees. The invention comprises a synchronous electrical generator unit 8 which is driven by the set shaft 5 through the chain 9, a control unit 24 operatively connected with the motor 6 and the generator unit 8, and a push button control box 22 that is operatively connected with the control unit 24 and through said unit with the motor 6.

There are three distinct cycles or phases in the construction and operation of the present invention. First, there is the pre-setting of the control for automatically setting or limiting the movement of the knees of the carriage 1 on the head blocks 3 toward the saw line. Secondly, there is the movement cycle of the knees 4 automatically for pre-set amount to effect a predetermined cut to be removed from the log. Thirdly, there is the operation or cycle of retracting the knees 4 on the blocks 3 after the predetermined cut has been made.

After an initial cut or cant has been removed from the log it is desirable to set the control unit to cut the desired thickness of cant off the log on the next movement of the carriage through the sawmill, or in other words, to pre-set the set works, which is the first cycle or phase. The automatic pre-setting of the control is accomplished by means of a push button control box 22 located near the sawyer, which is connected by an electric conduit 23 to the automatic control unit 24, which is also located relatively close to the sawyer and upon the pedestal 25.

The push button control switch, which is operated by the sawyer, determines in advance the amount that the log will be moved towards the saw line. This is accomplished by a group of solenoids, one of said solenoids being selected in the series to control the movement of a movable arm carrying a stop control switch. When this arm reaches the pre-selected solenoid, the amount that the knees 4 of the carriage 1 will be moved by the set shaft 5 will be predetermined. Then, on the operating of a second starter switch, the motor 6 on the carriage 1, for operating the set shaft 5, will be started to move the knees 4 and the log towards the saw line the predetermined amount. On reaching the predetermined amount the control unit will automatically stop the movement of the knees 4.

Referring to Figure 3, a group of push buttons 26 are located in the switch box 22 and, referring to Figures 4 and 11, are respectively connected by conductors 28 to a group of solenoids 27 and switches 29 in the control unit 24. These switches 29 are also connected to the group of solenoids 27 and are controlled by this operation. These circuits are best shown in Figure 11, where only two solenoids 27 and their respective switches 29, connected with two push buttons 26 are shown, due to lack of space on the drawing. When the solenoid 27 is energized, referring to Figure 10, its core 31 is moved to the dotted position and remains in this position until released, and this movement closes the switch 29 by means of the link 31'.

When one of the push buttons 26 is operated, the solenoid 27 controlled by the respective button is energized and closes its respective switch 29, which thereafter maintains an electric circuit direct from the feed line 30 through conductor 30A, switch 29 and the solenoid 27, even though its control button 26 is released, because the switch 29 is closed by the link 31'. The circuit extends from the solenoid 27 through conductor 32 to a solenoid 33, which controls magnetic switch 34, and through the solenoid 33 and the conductor 35 to the double throw snap switch 36. This switch 36 is closed at this time, the electrical energy passing from the contacts 37 through the conductor 38 to the feed line 39. This circuit cannot be completed until the snap switch 36 is in the position as illustrated in Figures 4 and 11.

Referring to Figure 4, the member 40 is a stationary element fixed to the framework 76 of the unit 24. The snap switch 36 is fixedly mounted to a movable arm 41 which is fixed by a hub 42, with another arm 43 that terminates in a gear segment 44. The hub 42 is journalled on the extension sleeve 45 which is formed integrally with a gear wheel 46. The gear wheel 46 also has a flange 101 fixed on the sleeve 45 and carrying a cam 69 for cooperation with the switch cam follower 70, as will be more fully described later on.

Referring back to the diagrammatic layout of Figure 11, when the solenoid 33 is energized it moves the switch bar 47 of the magnetic switch 34 to close the electric contacts 48 and 49, and thereby establish a circuit from the main line 39 through conductor 50, the contacts 49, conductor 51, motor 52, reverse switch 53 and back to the main line 30 by way of either the conductor 54 or 55, depending on which way the switch 53 is closed. The operation of the reverse switch 53 is controlled through the double throw snap switch 36 that is carried by arm 41, referring to Figures 4 and 11.

In the position shown in Figures 4 and 11, the switch 36 is in position to energize the motor 52, through its reverse switch 53, to operate the segment 44 in the direction of the arrow (Figure 4) by the pinion 56 driven by the motor 52. This will rotate the arm 41 in the direction of the arrow (Figure 4) towards the group of solenoids 27.

A trigger 57 is pivotally mounted at 58 to the arm 41 and is positioned to strike the core 31 of the solenoid 27 which has been selected by means of the push button 26. When the trigger 57 strikes the solenoid core 31 it will swing about its pivot 58, forcing the plunger 59 of the switch 36 to the right, as viewed in Figures 4 and 8. When the plunger 59 is moved it opens the contacts 37 within the switch 36 and closes the contacts 60, referring to Figure 11. The closing of the contacts 60 will operate a solenoid 61 to reverse the switch 53. This operation of the reverse switch 53 reverses the drive of the motor 52, whereupon it returns the gear segment 44 to its starting position, which is that shown in Figure 4.

When the gear segment 44 is moved in the direction of the arrow, a pawl 62, which is pivotally mounted to the outer end of the arm 41, will engage the teeth 63 of the gear wheel 46 and move the wheel 46 with the arm 41 until the trigger 57 strikes the core 31 of one of the solenoids 27 which stops the forward movement of the arm 41 by reversing the motor 52, as hereinbefore described, and returns the arm 41 to starting position. While the arm 41 is returned to the starting position, which is that shown in Figure 4, the brake shoe 64 will bear against the brake drum 65, associated with the gear wheel 46, and hold the gear wheel 46 from returning with the arm 41 while the pawl 62 ratches back over the teeth 63. Thus the gear wheel 46 is retained, with its cam 69, in set position, while the remainder of the control mechanism is returned to starting position.

When the arm 41 returns to its starting position, a cam 66 lifts the pawl 62, by striking the stop 67 which forms parts of the fixed element 40. This frees the pawl 62 from the teeth 63 to permit the subsequent return of the gear wheel 46. Also, when the arm 41 is returned to the starting position, the plunger 59 of the switch 36 will strike the fixed abutment 68 of the element 40, thereby moving the plunger 59 to open the contacts 60 and close the contacts 37 of the switch 36.

The circuit through the contacts 60 merely moves the reverse switch 53 to its reverse position, the switch 53 normally being returned to its forward position by either gravity or spring action, not here shown. Therefore, when the arm 41 reaches its forward position to where the trigger 57 contacts the solenoid core 31, it opens the circuit through the conductor 35 and the magnetic switch 34, which, in turn, opens the circuit through the motor 52 as well as other circuits through the said switch 34.

The instant the arm 41 is moved forward in the direction of the arrow, the plunger 73 of the switch 72 is released to close the contacts 74 of the switch 72 to form a circuit by conductors 50' and 51' which extend between the conductors 50 and 51. The closing of this circuit energizes the motor 52 to maintain its operation after the opening of the contacts 49 and while reversed by the reverse of the switch 53, to return the arm 41 to its starting position. When the arm 41 reaches starting position, it abuts the plunger 73 of the switch 72 to open the contacts 74 and stop the electric supply to the motor 52. As previously stated, when the arm 41 returns, the contacts 37, within the switch 36, are again closed, which sets the stage for another cycle of operation when one of the selector buttons 26 is again pressed.

As previously stated, when the arm 41 moves the gear wheel 46, in the direction of the arrow, it also moves the cam 69, forming part of the said gear wheel 46, to a pre-set position and away from under a cam follower wheel 70 which controls a limit switch 71. The limit switch controls the operation motor 6 by means of a circuit from the supply line 39 through conductor 78, switch 71, magnet 79, contacts 105 of switch 80, and conductor 81 to supply line 30. When this circuit is closed the magnet 79 is energized and breaks the switch 82 in the circuit of the motor 6.

When the gear wheel 46 is in starting position, the cam 69 lifts the follower 70 to close the limit switch 71 and energizes the magnet 79 to open the motor circuit switch 82 so that the motor 6 is inoperative. When the wheel 46 and cam 69 are moved, however, the follower 70 drops to the periphery of the flange 101 and opens the limit switch 71, de-energizing the magnet 79 and permitting switch 82 to close. The distance that the gear wheel 46 and cam 69 are moved from the follower 70 will determine the movement of the knees 4 on the carriage 1 towards the saw line and, therefore, the thickness of the cant to be removed from the log.

Referring to Figure 5, the extension sleeve 45 is formed integral with the gear wheel 46 and is journalled within the bearing 20. An indicating hand 77 is fixed to the outer end of the sleeve 45 for movement therewith to indicate the amount that the knees 4 on the carriage 1 are to be moved forward on the head blocks 3 towards the saw-line. Thus, the control mechanism within the unit 24 is set to automatically effect the movement of the knees a predetermined distance toward the saw-line, and the first cycle of operation is completed.

The next cycle is concerned with the moving of the knees 4 the pre-set amount relative to the saw-line. As previously stated, when the cam 69, carried by the gear wheel 46, is moved from under and away from the cam wheel 70, the limit switch 71 is opened and breaks an electric circuit from the supply line 39, through conductor 78, limit switch 71, through the magnet 79, through the contacts 105 of switch 80 and conductor 81 to the supply line 30. This opening of switch 71 permits the electric contacts 82 to close, due to the demagnetizing of the solenoid 79, making it possible to complete an electric circuit through the electric motor 6, referring to Figures 1 and 11, for operating the set shaft 5 on the carriage 1 for moving the knees 4 forward the selected amount.

This electric circuit through the motor 6 is completed by a separate operation of the sawyer relative to the reversing switch 83. This switch may be located at any convenient point, as for instance in switch box 22, as shown in Figs. 1 and 3; however, it may be positioned in any other convenient location. When the sawyer operates the said switch 83, as, for instance, to drive the motor 6 in a forward rotation, the set shaft 5 is rotated by the motor 6. When the switch 83 is closed an electric circuit from the supply line 85 is completed through contacts 84 contact bar 86, contact points 82, conductor 87, the motor 6 and back to the main line 88. As long as the switch 83 bridges the contacts 84, the motor 6 will continue to operate forwardly.

As previously stated, the invention comprises a synchronous generator unit 8, driven from the set shaft 5, and means for automatically limiting the movement of the knees in addition to the hereinbefore described pre-set mechanism. This synchronous generator unit 8 comprises one or more synchronous generators which are connected by conductors 89 to drive synchronous motors 10 within the control unit 24. The generators, being directly connected to the set shaft 5, generate electric impulses that are supplied by the conductors 89 to the synchronous motors 10 positioned within the control unit 24.

Referring to Figures 4 through 7, a pair of synchronous motors 10 drive a counter shaft 11 through the pinion gears 12 and 13 from one of the motors 10 and through the counter shaft assembly 14, spur gears 15 and pinions 16 from the other of the synchronous motors. It has been found in the operation of synchronous hookups that where generators and motors driving a single unit are hooked up in such a manner as to operate at different speeds, the device performs more accurately, although I do not wish to be limited to this type of hookup, as the primary object of this feature of my control unit is that the number of revolutions that the set shaft 5 makes in setting up the knees of the carriage is transferred by the exact number of revolutions to the countershaft 11.

The countershaft 11 carries sprocket 17' which drives the chain 17 and a sprocket 18 that is fixed on a cross-shaft 19 as best illustrated in Figures 4, 5 and 6. The sprocket 18 carries a limit switch 71 which is actuated by the cam follower 70 which rides on the flange 101 and cooperates with the cam 69. The shaft 19 is journalled in the sleeve 45 of the gear wheel 46 which, in turn, is journalled in the bearing 20 that is supported by spider arms from the frame 76 of the control unit 24. An indicating hand 21 is fixedly mounted to the end of the shaft 19 and indicates to the sawyer the exact position of the knees 4 of the carriage 1 relative to the saw line. This hand 21 is moved in accordance with the movement of the knees 4 by the synchronous drive from the set shaft 5 through the generators 8 and motors 10 and drive from said motors through the chain 17 to the shaft 19 which carries the hand 21. Thus, the hand 21 indicates the exact position of the knees 4 whereas the hand 77 indicates the position to which the knees are to be moved.

In operation, when the set shaft 5 is operated by the motor 6 through the gears 7, the chain 9 and the synchronous generators 8 will impart electrical impulses through the conductors 89 to the synchronous motors 10. The motors 10 will rotate the sprocket 18 through the chain 17, in the direction indicated by the arrows (Figures 4 and 11), and revolve the limit switch 71 and its cam following roller 70 until the roller contacts the cam 69 in its pre-set position. This will then complete the electric circuit through the limit switch 71 and magnet 79, which will break the contacts 82, thereby opening the motor circuit through these contacts by way of the conductor 87, the switch bar 86, contacts 84 to the main line conductor 85. This stops the motor 6 and, consequently, the movement of the knees 4 on the head blocks 3 towards the saw line in accordance with the selected distance that the gear wheel 46 had been advanced through the presetting action of the solenoids 27 as previously described.

When the driven sprocket 18 has been revolved to where the limit switch 71 opens the motor circuit 6, it will also have carried the hand 21 into alignment with the hand 77, which is connected to the gear wheel 46, thereby indicating to the operator that the knees have been moved the desired distance.

The above description has set forth the cycle of the presetting of the movement of the knees, and the cycle of the actual forward movement and stopping of the knees at the preselected position. In the event that it is desired to take another cut from the log, the same operation will be repeated, but in the event that it is desired to retract the knees on the head blocks 3, the third cycle will be effected.

The direction of drive of the motor 6 may be reversed by the reversing switch 83, and, at the same time, the gear wheel 46 should be returned to starting position. The wheel 46 may conveniently be returned by being locked with the sprocket 18 which is reversely driven due to the reverse drive of the motor 6 which is transmitted through the generators 8 and motors 10. The coincident return of the gear wheel 46 and sprocket 18 will also return the indicating hands 21 and 77. The indicating hand 21 being connected through the shaft 19 with the sprocket 18 and the indicating hand 77 being connected to the gear wheel 46 through the sleeve 45, when these members are locked, their hands will be in alignment.

I will now describe how the above operation takes place. Referring to Figures 3 and 11, when the reversing switch 83 is moved to reverse position it will bridge the contacts 90 closing an electric circuit from the main line 85, through the motor 6, contacts 90, the solenoid 91, conductor 92 and to the main line 88. This will reverse the direction of drive of the motor 6 and, therefore, the direction of rotation of the set shaft 5, thereby retracting the knees 4 from the saw line.

When the solenoid 91 is energized, it closes the electric contacts 94 which deliver electrical energy from the supply line 30, through contacts 94 to the solenoid 95 and to the supply line 39. When the solenoid 95 is energized, the contacts 96 of the switch 80 will be closed and complete an electric circuit through the conductor 97 and solenoid 98, which actuates a pivotally mounted latch 99, as best shown in Figures 4, 9 and 11. When the solenoid 98 is energized, it moves the latch 99 into engagement with the notch 100 located within the hub of the sprocket 18 and with the notch 102 in the flange 101 forming part of the sleeve 45 and gear wheel 46. The latch 99 is normally biased from the notches 100 and 102 by the spring 103. When the gear wheel 46 and sprocket 18 are locked together, they will be returned together to their starting point, when the motor 6 is disconnected by the normally opening of the reversing switch 83.

The switch 80 is of the double throw snap type, so that when either the solenoid 95 or the solenoid 104 is energized, the switch bar will stay where either of the solenoids has moved it. I have just described the operation of the solenoid 95 moving the bar 80 in connection with the contacts 96 for locking together the gear wheel 46 and sprocket 18. When the unit is pre-set by the operation of a push button switch 26, the pre-set motor 52 and the set shaft motor 6 will not operate until the solenoid 104 is energized to move the switch bar 80 to bridge the contacts 105, as shown in Figure 11.

In the event I wish to move the knees 4 of the carriage 1 by manual operation, the switch 83 is moved to bridge the contacts 84 and deliver electrical energy from the line 85 through contacts 84, contact bar 86, contacts 82, conductor 87 and motor 6 to the line 88. This will drive motor 6 in forward direction until the switch 83 is manually opened. The contacts 82 will be closed to accommodate the manual operation because the bar of the switch 80 remains across the contacts 96 after the knees were retracted until one of the push button switches 26 is closed in the presetting operation to complete a circuit through the solenoid 33 and close the switch 34 to complete a circuit through the contacts 48, of the switch 34, and solenoid 104 which effects the movement of the switch 80 to bridge its contacts 105 and complete the circuit through the magnet 79 to open the contacts 82 in the motor circuit. When the switch 80 remains closed across the contacts 96, the solenoid 79 will remain demagnetized even though the limit switch 71 is closed, due to the fact that the contacts 105 of the switch 80 are open. Thus, the contacts 82 remain closed, permitting the manual operation of the motor 6 through the reverse switch 83, either forward or backward, until one of the push buttons 26 of the presetting switch box 22 is again operated.

I will now describe my auxiliary fractional control for presetting the unit for fractional movement of the knees 4 on odd cuts. Referring to Figures 4 and 11, the solenoids 106 and 107 are fixedly mounted to the frame of the unit. Their cores 108 being pivotally connected with levers 109, which, in turn, are pivotally mounted to the frame 76 at 110 and carry dogs 111 for engaging the teeth 63 of the gear wheel 46. The dogs 111 are normally held out of engagement with the teeth 63 by fixedly mounted pins 112 which are abutted by arms 113 and form part of the dogs 111. When solenoids 106 and 107 are deenergized, the cores 108 are in neutral or starting position, there being a spring (not shown) inside each of the solenoids for maintaining said positions.

The solenoids 106 and 107 are controlled from the switch box 22 by push buttons 114 and 115 to effect forward or reverse movement of the gear wheel 46. As stated, the movement of the gear wheel 46 determines the position of the cam 69 relative to the cam 70 of the limit switch 71. In the event that it is desired to cut a cant of fractional thickness of the standard cuts effected by the spacing of the solenoids 27, the forward button 114 will be pressed energizing the solenoid 106 which pulls the lever 109 to engage its pawl 111 with the teeth 63 of the gear wheel 46, moving said wheel the desired fractional distance, depending on the number of switch button operations. This moving of the gear wheel 46 moves the cam 69 a fractional distance from the cam follower 70 of the limit switch 71. Vice versa, the operation of the button 115 will operate the solenoid 107 and its pawl 111 rotating the gear wheel 46 in the opposite direction, moving the cam 69 closer to the cam wheel 70 after a presetting has been made and thereby subtracting from the cut of the saw.

Although I have shown and described a certain specific embodiment of my invention, I am fully aware that many modifications thereof are possible. My invention, therefore, is not to be restricted except in so far as is necessitated by the prior art and by the spirit of the appended claims.

What I claim is:

1. Apparatus for pre-setting the angular movement of a set shaft operative by a primary motor having a supply circuit, said apparatus comprising a support, a limit element movably mounted on said support, drive mechanism including a secondary motor for moving said element to a selected position, a member on said support for movement relative to said element and for abutment therewith, means operable by the set shaft for moving said member in accordance with the movement of the shaft to contact said element in its pre-set position, and means controlled by said member for breaking the primary motor supply circuit upon abutment by said member with said element.

2. Apparatus as defined in claim 1 wherein said member comprises a switch having an operating part for abutment with said limit element, and said member controlled means comprises a magnet in circuit with said switch and controlling a switch in the primary motor supply circuit.

3. In a sawmill apparatus of the type wherein a carriage is reciprocated past a stationarily positioned saw, and knees are movably mounted on said carriage and operated through a set shaft by a motor mounted on said carriage and which is selectively actuated by a control unit, the combination with said control unit of a fixed support therefor adjacent the saw position, control mechanism in said unit for automatically controlling operation of said motor to move said knees a selected predetermined amount, and flexible connection means extending between said control mechanism in said fixed control unit and said motor to permit movement of the latter with the carriage.

4. In an apparatus as defined in claim 3, the combination with said carriage of a generator driven from said set shaft, a motor in said control unit for driving some of the mechanism thereof, and flexible connection means extending between said generator and said control unit motor.

5. Apparatus as defined in claim 3 wherein said control unit is provided with a dial, a hand is movable on said dial by said control mechanism to indicate the pre-set position for the knees, and a second hand is movable by said control mechanism to indicate the exact and progressive position of said knees.

6. Apparatus for pre-setting the angular movement of a set shaft operative by a primary motor having a supply circuit, said apparatus comprising a support, a limit element movably mounted on said support, means for moving said element to a selected position, a member on said support for movement relative to said element and for abutment therewith, said member comprising a switch having an operating part for abutment with said limit element, means operable by the set shaft for moving said member in accordance with the movement of the shaft to contact said element in its selected pre-set position and including a movable support for said switch part, drive mechanism for said movable support, a synchronous motor for driving said drive mechanism, a generator driven by the set shaft and connected to supply current to said synchronous motor, and means controlled by said member for breaking the primary motor supply circuit upon abutment by said member with said element and including a magnet in circuit with said switch and controlling a switch in the primary motor supply circuit.

7. Apparatus as defined in claim 6 wherein said element moving means comprises a drive mechanism for moving said element, a motor for driving said element drive mechanism, a supply circuit for said element drive motor, a plurality of spaced solenoids for selectively cooperating with said element drive mechanism to limit the movement thereof, a supply circuit for each of said solenoids, a magnet in and common to said solenoid circuits, a switch in said element drive motor circuit controlled by said magnet to be closed upon energization thereof, a switch in and common to said solenoid circuits and operable by said element drive mechanism to break the solenoid circuits upon movement of said mechanism to the limit permitted by the selected solenoid, and a manually controlled switch for each of said solenoid circuits.

8. Apparatus as defined in claim 7 wherein means are cooperative with said element to hold said element in pre-set position; a reverse switch is provided in said element drive motor circuit for reversing said motor to return said element drive mechanism to initial position, a secondary element drive motor circuit bypassing said magnetically controlled switch, a switch in said secondary circuit controlled by said element drive mechanism to open said switch only when said element drive mechanism is in initial position, a solenoid operatively connected with said reverse switch, and a switch in circuit with said reverse switch solenoid and operative by said element drive means upon abutting the selected limit solenoid to energize said reverse switch solenoid and reverse said motor to return said element drive mechanism to initial position.

9. Apparatus as defined in claim 8 wherein a latch is adapted to lock said element and said switch-part support together when they are in abutment, a solenoid for operating said latch, a magnetic switch controlling said latch solenoid breaking said switch part circuit to operate said latch and close said set shaft motor circuit, and a second magnetic switch operated by the reversing of said master reverse switch when reversing said set shaft motor to energize and operate said first magnetized switch.

10. Apparatus for pre-setting the angular movement of a set shaft operative by a primary motor having a supply circuit, said apparatus comprising a support, a limit element movably mounted on said support, drive mechanism including a motor for moving said element to a selected position, a supply circuit for said element drive motor, a plurality of spaced solenoids for selectively cooperating with said element drive mechanism to limit the movement thereof, a supply circuit for each of said solenoids, a magnet in and common to said solenoid circuits to be energized upon actuation of any one of said solenoids, a switch in said element drive motor circuit controlled by said magnet to be closed upon energization thereof, a limit switch in and common to said solenoid circuits and operable by said element drive mechanism to break the solenoid circuits upon movement of said mechanism to the limit permitted by the selected solenoid, a control switch for each of said solenoid circuits, a member on said support for movement relative to said element and for abutment therewith, means operable by the set shaft for moving said member in accordance with the movement of the shaft to contact said element in its selected pre-set position, and means controlled by said member for breaking the primary motor supply circuit upon abutment by said member with said element.

11. Apparatus for pre-setting the angular movement of a set shaft operative by a primary motor having a supply circuit, said apparatus comprising a support, a limit element movably mounted on said support, drive mechanism including a secondary motor for moving said element to a selected pre-set position, a plurality of spaced solenoids for selectively cooperating with said element drive mechanism to limit the movement thereof, means for holding said element in pre-set position, a magnetically controlled switch controlling said secondary motor, a reverse switch in said secondary motor supply circuit for reversing said secondary motor to return said element drive mechanism to initial position, a by-pass circuit for said secondary motor and bypassing said magnetically controlled switch, a switch in said bypass circuit and controlled by said element drive mechanism to open said by-pass circuit only when said element drive mechanism is in initial position, a solenoid operatively connected with said reverse switch, a switch in circuit with said reverse switch solenoid and operative by said element drive mechanism upon abutting the selected limit solenoid to energize said reverse switch solenoid and reverse said secondary motor to return said element drive mechanism to initial position, a member on said support for movement relative to said element and for abutment therewith, means operable by the set shaft for moving said member in accordance with the movement of the shaft to contact said element in its pre-set position, and means controlled by said member for breaking the primary motor supply circuit upon abutment by said member with said element.

12. Apparatus for pre-setting the angular movement of a set shaft operative by a primary motor having a supply circuit, said apparatus comprising a support, a limit element movably mounted on said support, drive mechanism including a secondary motor for moving said element to a selected position, a plurality of spaced solenoids selectively cooperative with said element drive mechanism to limit the movement thereof, a pair of pawls respectively cooperative with said element drive mechanism to selectively drive said mechanism step-by-step in opposite directions, whereby to pre-set said element at fractional positions between the standard positions of said spaced solenoids, stops cooperative with said pawls to normally retract them from operative position, solenoids for respectively operating said pawls, a control switch for operating each of said solenoids, a member on said support for movement relative to said element and for abutment therewith, means operable by the set shaft for moving said member in accordance with the movement of the shaft to contact said element in its pre-set position, and means controlled by said member for breaking the primary motor supply circuit upon abutment by said member with said element.

OSCAR NATHANIEL HULT.

REFERENCES CITED

The following references are of record in the file of this patent:

UNITED STATES PATENTS

| Number | Name | Date |
| --- | --- | --- |
| 387,714 | Fiske | Aug. 14, 1888 |
| 1,017,150 | Holme | Feb. 13, 1912 |
| 2,342,967 | Peters | Feb. 29, 1944 |
| 2,472,046 | Malcolm | May 31, 1949 |